(12) United States Patent
Yan et al.

(10) Patent No.: US 6,510,754 B2
(45) Date of Patent: Jan. 28, 2003

(54) MECHANICAL TRANSMISSION MODULE

(76) Inventors: Hong-Sen Yan, No. 24, Lane 93, Dong-Ning Rd., Tainan (TW); Chin-Lung Chiang, No. 11-16, Wan-Chin Rd., Ta-She Hsiang, Kaohsiung Hsien (TW)

( * ) Notice: Subject to any disclaimer, the term of this patent is extended or adjusted under 35 U.S.C. 154(b) by 8 days.

(21) Appl. No.: 09/750,079

(22) Filed: Dec. 29, 2000

(65) Prior Publication Data

US 2002/0083786 A1 Jul. 4, 2002

(51) Int. Cl.[7] ........................... F16H 55/17; G09B 25/00
(52) U.S. Cl. ........................................ 74/436; 434/401
(58) Field of Search ........................ 74/29, 25, 606 R, 74/44, 45, 422; 464/104, 102; 434/401, 302

(56) References Cited

U.S. PATENT DOCUMENTS

| | | | | |
|---|---|---|---|---|
| 4,676,762 A | * | 6/1987 | Ballard | 446/104 |
| 5,411,428 A | * | 5/1995 | Orii et al. | 446/90 |
| 5,779,515 A | * | 7/1998 | Chung | 446/90 |
| 6,227,065 B1 | * | 5/2001 | Petersen | 74/422 |

* cited by examiner

Primary Examiner—David A. Bucci
Assistant Examiner—Justin Stefanon
(74) Attorney, Agent, or Firm—Rosenberg, Klein & Lee (57) ABSTRACT

A mechanical transmission module has two plates, a transmission mechanism and an actuating axle. The two plates are mounted together with a gap formed between the plates. The transmission mechanism is mounted between the plates. The transmission mechanism can be a Geneva mechanism, a worm and gear mechanism, a belt drive assembly, a threaded rod and slide mechanism, a geared mechanism and so on. The actuating axle extends out from the two plates and drives the transmission mechanism. A connector is secured to a free end of the actuating axle. The connector has a groove and a protrusion in the external face to engage with the groove and protrusion on the connector of another mechanical transmission module. Accordingly, the transmission mechanisms can be modularized and combined with each other. The combination and transmission relations between different types of transmission mechanisms are easily be understood through use of the modules.

18 Claims, 13 Drawing Sheets

MECHANICAL TRANSMISSION MODULE

BACKGROUND OF THE INVENTION

1. Field of the Invention

The present invention relates to a mechanical transmission module, and more particularly to a mechanical transmission module having a mechanical transmission mechanism arranged between two plates and being able to connect to and operate with the other mechanical transmission modules.

2. Description of Related Art

A mechanical transmission mechanism is used to transmit power from one mechanical device to another and ultimately from a prime mover to cause an actuated device to rotate, operate, move or reciprocate. Conventional mechanical transmission mechanisms have lever linkage mechanisms, gear mechanisms, belt drive assembly, pulley and belt mechanisms, chain and chain wheel mechanisms and so on. Different mechanical transmission mechanisms use different mechanical techniques to modify and transmit the power received. A model of each mechanical transmission mechanism is usually set up in mechanics and mechanical engineering classrooms so students can see how the mechanical transmission mechanism operates and understand the specific principals of operation. However, conventional mechanical transmission mechanism models cannot be connected to another mechanical transmission mechanism model with a different type of transmission mechanism. Consequently, many students have difficulty fully understanding the transmission techniques and relationships between different types of the transmission mechanisms when conventional models are used.

To overcome the shortcomings, the present invention provides a mechanical transmission module that can be connected to other mechanical transmission module to mitigate or obviate the aforementioned problems.

SUMMARY OF THE INVENTION

The main objective of the invention is to provide a mechanical transmission module that can be combined with and transmit to another mechanical transmission module having a different type of transmission mechanism. The mechanical transmission module has two plates, a transmission mechanism and an actuating axle. The two plates connected to each other with a gap between the plates. Two perpendicular, bisecting slots are defined in each plate and align with the slots defined in the other plate. The transmission mechanism is arranged between the plates. The transmission mechanism can be a Geneva mechanism, a worm and gear mechanism, a belt drive assembly, threaded rod and slide mechanism, a gear mechanism and so on. The actuating axle extends out from the two plates, connects to the mechanical transmission mechanism and serves as the input for the power to the mechanical transmission mechanism. A connector is attached to a free end of the actuating axle. The external face of the connector has a groove and a protrusion to engage with the corresponding groove and protrusion on the connector of another mechanical transmission module. By such an arrangement, the transmission mechanism in each module can be attached to and transfer force from another module by means of the engagement between two connectors. The combinations and transmission relations between different types of transmission mechanisms are easily understood through the modules.

Other objects, advantages and novel features of the invention will become more apparent from the following detailed description when taken in conjunction with the accompanying drawings.

DETAILED DESCRIPTION OF PREFERRED EMBODIMENT

Figure 1:
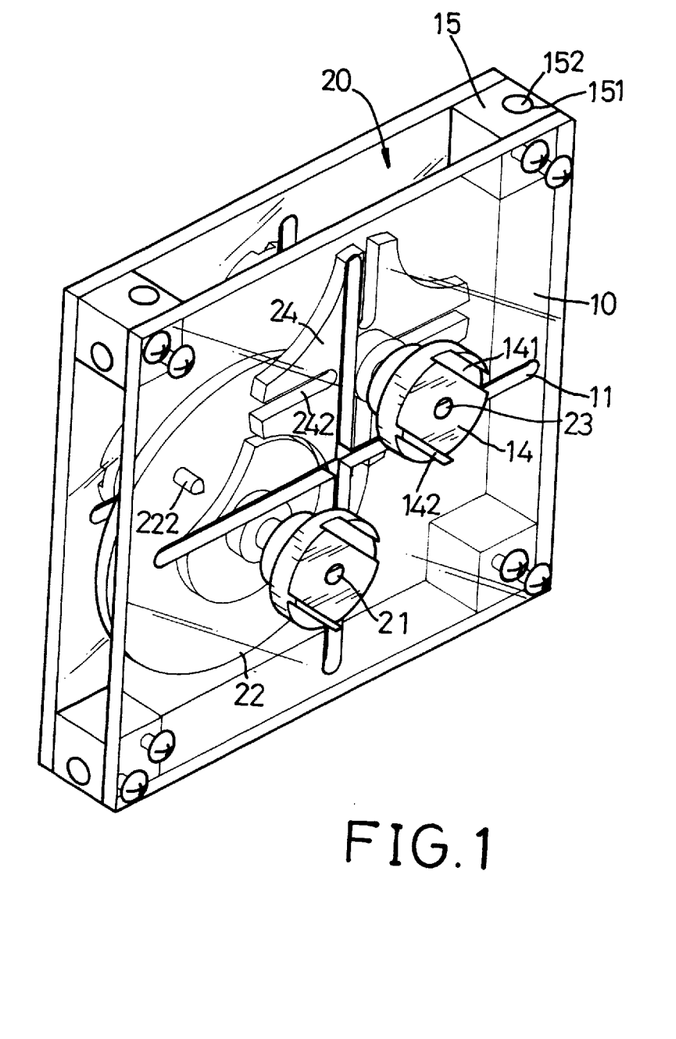
FIG. 1 is a perspective view of a first embodiment of the mechanical transmission module in accordance with the present invention.
Figure 2:
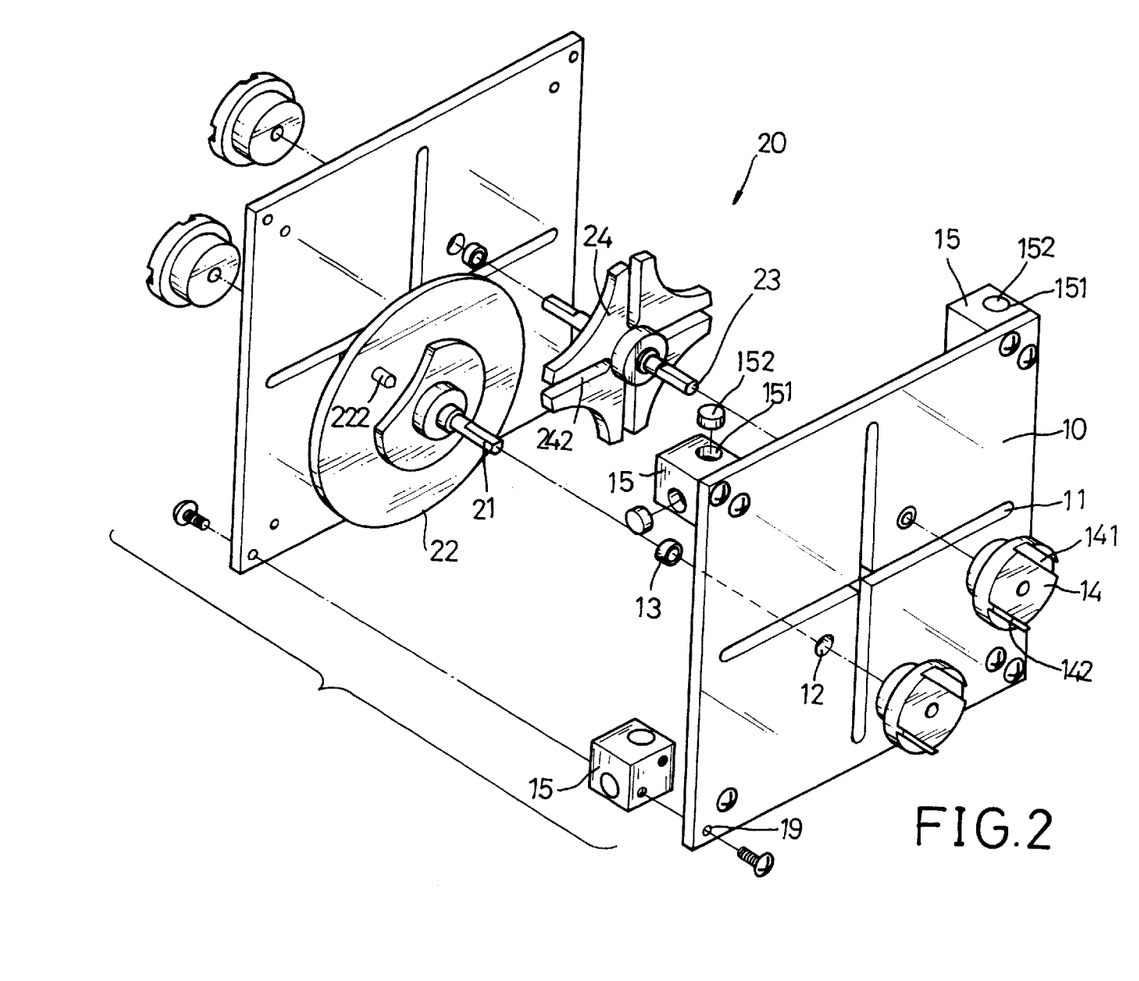
FIG. 2 is an exploded perspective view of the first embodiment of the mechanical transmission module in FIG. 1.
Figure 3:
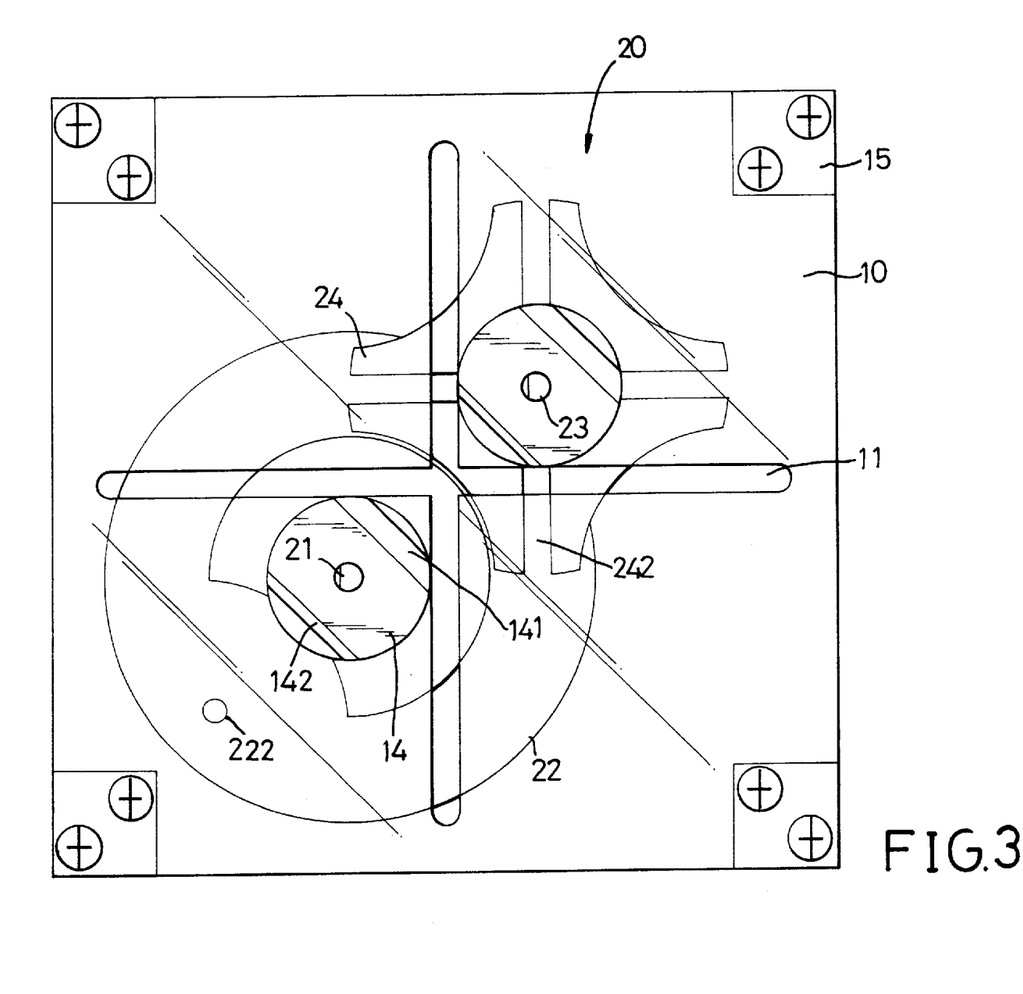
FIG. 3 is a front plan view of the first embodiment of the mechanical transmission module in FIG. 1.

With reference to FIGS. 1 to 3, a mechanical transmission module in accordance with the present invention comprises two plates (10), a transmission mechanism, an actuating axle (21) and a connector (14). The two plates (10) are square, aligned with each other and attached to each other with a gap between the plates (10). A block (15) is secured between each pair of corresponding corners of each plate (10) with bolts to separate the plates (10). A recess (151) is defined in the two outside faces of each block (15). A magnet (152) is securely mounted in each recess (151) in the blocks (15), such that the plates (10) of different module units can be connected together by the magnets (152). Two perpendicular, bisecting slots (11) are defined in each plate (10) such that the slots (11) in both plates (10) align with each other.

The mechanical transmission mechanism is mounted between the plates (10). The actuating axle (21) is connected to the mechanical transmission mechanism. The actuating axle (21) extends either through at least one of the plates (10) or the gap defined between the plates (10). A bore (12) is defined in each plate (10) through or into which the actuating axle (21) extends. A bearing (13) is pressed into the bore (12) to allow the actuating axle (21) to rotate. In practice, the bore (12) is defined in the plate (10) on the diagonal line between opposite corners.

The connector (14) is attached to one end of the actuating axle (21). A parallel groove (141) and protrusion (142) are formed on the outside face of the connector (14) to engage with the groove (141) and protrusion (142) on the connector (14) of another mechanical transmission module. Therefore, the transmission mechanisms of different modules can be linked to each other by the engagement of the connectors (14).

With reference to FIGS. 1 to 3, the first embodiment of the transmission mechanism is a Geneva mechanism (20). The Geneva mechanism (20) includes a Geneva wheel (22) and a Geneva gear (24) meshed with the Geneva wheel (22). The Geneva wheel (22) is co-axially mounted on the actuating axle (21). The two ends of the actuating axle (21) respectively extend through the bores (12) in the plates (10). A first connector (14) is secured to each end of the actuating axle (21).

Figure 4:
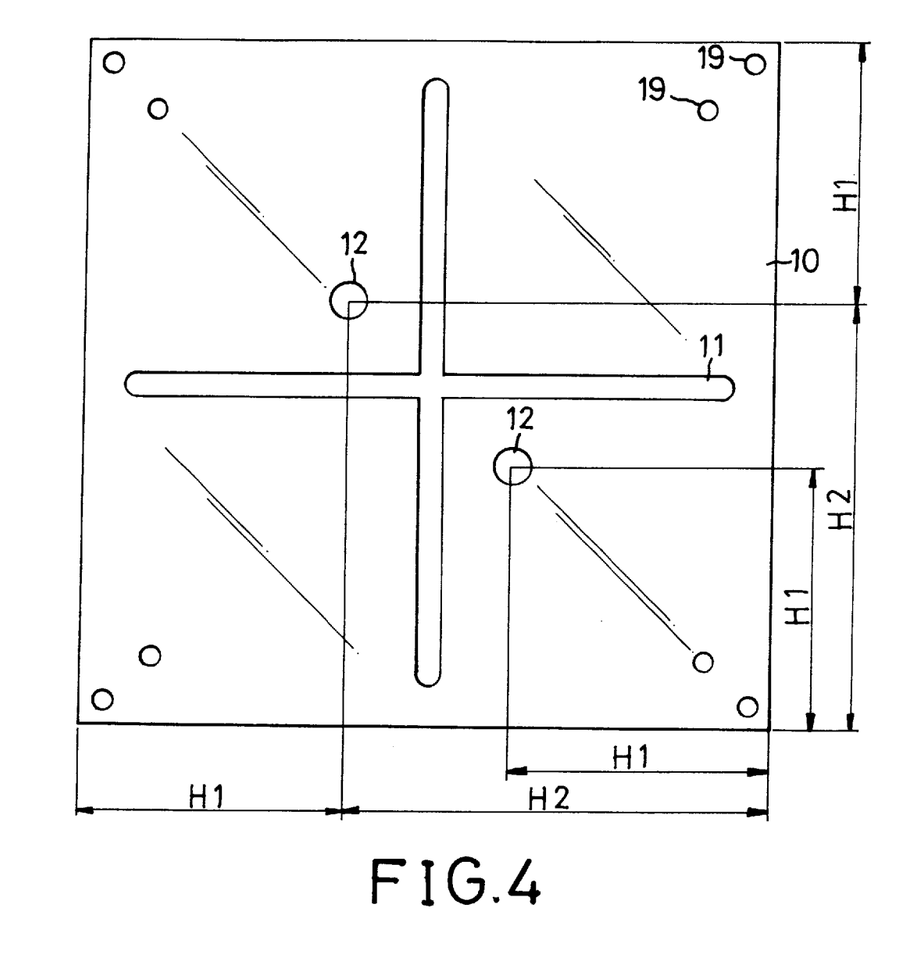
FIG. 4 is a plan view of one of the plates in FIG. 1.

The Geneva gear (24) is co-axially mounted on a drive axle (23). Each end of the drive axle (23) extends through another bore (12) defined in each plate (10). A bearing (13) is pressed into the bore (12) to allow the drive axle (23) to rotate. Both bores (12) on each plate (10) are on the same diagonal line between opposite corners of the plate (10). With reference to FIG. 4, the distance H1 between the bore (12) and the closest edges of the plate (10) is equal to the distance between the other bore (12) and the closest edges of the plate (10). In another words, the distance H1 between the bore (12) and the closest edges of the plate (10) plus the distance H2 between the other bore (12) and the same edges of the plate (10) is equal to the length of one edge of the plate (10). By such a symmetrical arrangement, the actuating axle (21) and the drive axle (23) of the module unit will still align with the actuating axle (21) and the drive axle (23) of another module unit even if the module unit is reversed.

With reference to FIGS. 1 to 3, a second connector (14) is secured to each end of the drive axle (23). The second connector (14) has the same configuration as the first connector (14) and has a groove (141) and protrusion (142) to engage with the groove (141) and protrusion on the connector (14) of another mechanical transmission module.

In practice, one of the first connectors (14) is connected to a power source or the connector (14) of another module. The Geneva wheel (22) rotates with the actuating axle (21). The Geneva gear (24) will rotate with the Geneva wheel (22) as a stub (222) formed on the Geneva wheel (22) engages with a channel (242) defined in the Geneva gear (24). The drive axle (23) rotates with the Geneva gear (24). The Geneva gear (24) will stop rotating when the stub (222) moves out of the channel (242) in the Geneva gear (24). Consequently, the drive axle (23) will rotate intermittently, and the actuating axle (21) of another module connected to the second connector (14) will be rotated intermittently.

Figure 5:
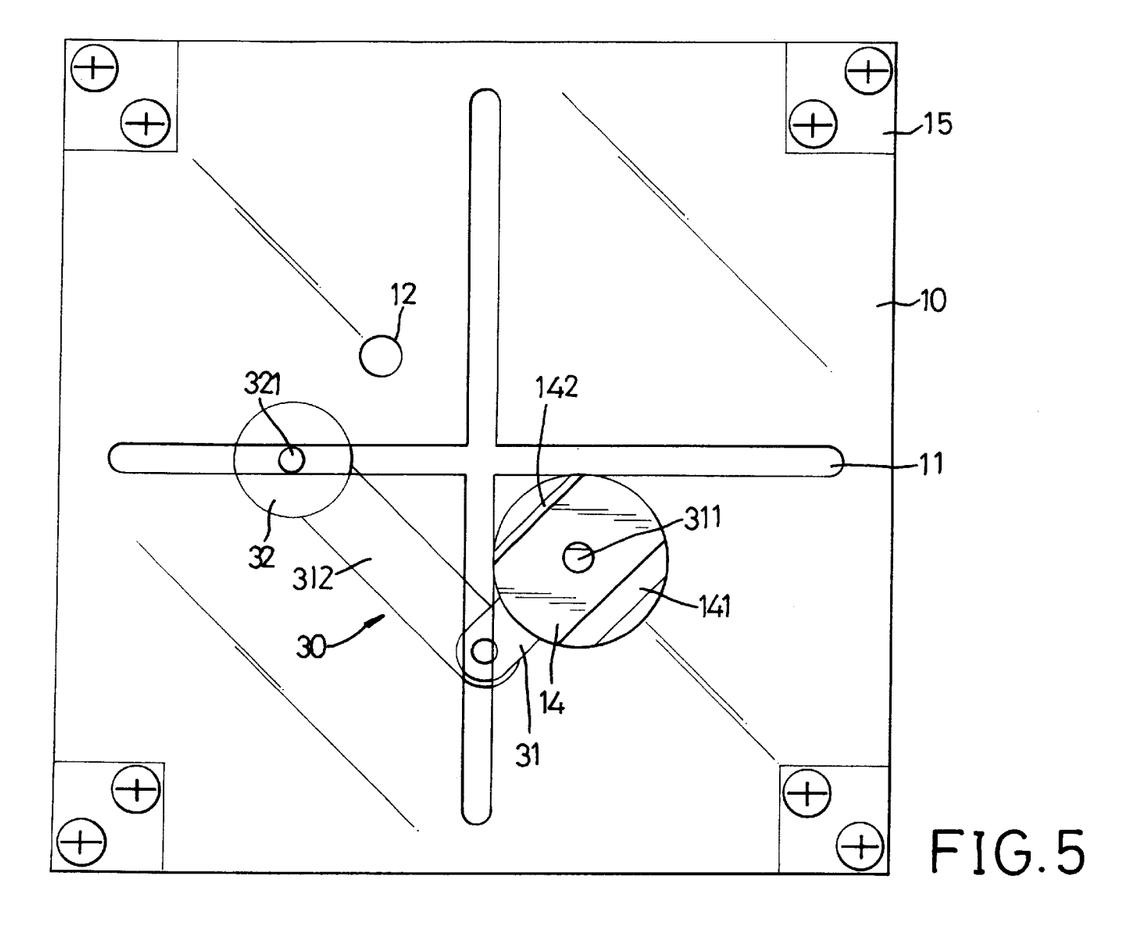
FIG. 5 is a front plan view of a second embodiment of the mechanical transmission module in accordance with the present invention.

With reference to FIG. 5, the second embodiment of the transmission mechanism is a slide-crank mechanism (30) to convert rotational movement to reciprocating movement. The slide-crank mechanism (30) includes a first arm (31), a second arm (312) and a slide (32). The actuating axle (311) extends out of the bore (12) in one of the plates (10). The first arm (31) is connected to the actuating axle (311) between the plates. The second arm (132) is connected between the first arm (31) and the slide (32). A pin (321) is attached to the slide (32) and extends into the slot (11) in one or both of the plates (10). Accordingly, the first arm (31) will rotate with the actuating axle (311) when a torque is applied to the connector (14), and the slide (32) will move along the slot (11) by the push or pull applied by the second arm (312).

Figure 6:
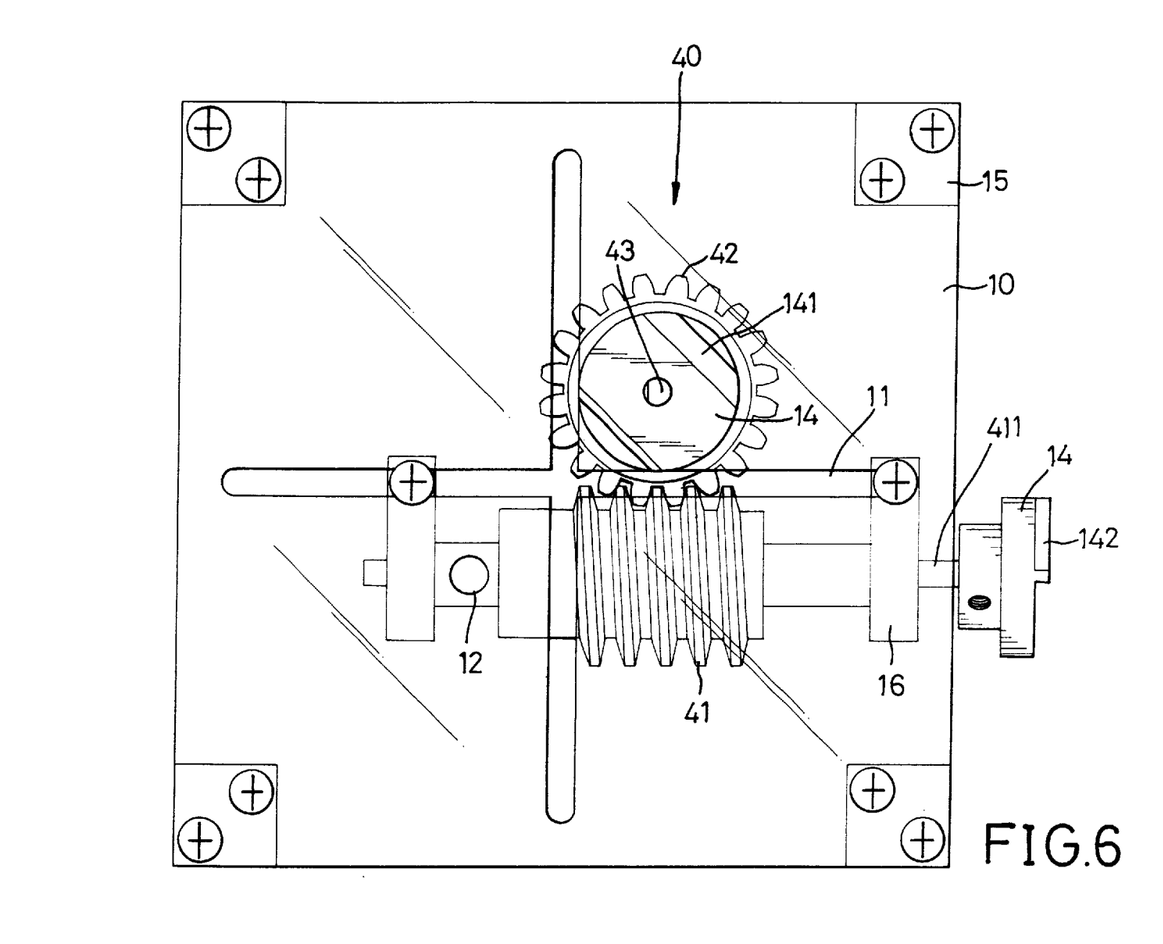
FIG. 6 is a front plan view of a third embodiment of the mechanical transmission module in accordance with the present invention.

With reference to FIG. 6, the third embodiment of the transmission mechanism is a worm and gear mechanism (40) to change the direction of rotation by 90°. The worm and gear mechanism (40) includes a worm (41) and a worm gear (42) engaged with the worm (41). The actuating axle (411) extends out from between the plates (10) parallel to the nearest edge and at the same position as one of the bores (12). Two blocks (16) are mounted between the plates (10), and the actuating axle (411) rotatably extends through the blocks (16) with one end extending beyond the edge of the plates (10). A first connector (14) is attached to the end of the actuating axle (411). The worm (41) is co-axially secured to the actuating axle (411) between the blocks (16). The worm gear (42) is co-axially connected to the drive gear (42). The drive axle (43) extends out from the other bore (12) in the plate (10). A second connector (14) is attached to the end of the drive axle (43). The configuration of the second connector (14) is same to that of the connector (14) secured to the actuating axle (411). The second connector (14) has a groove (141) and a protrusion (142) to engage the groove (141) and protrusion on the connector (14) of another mechanical transmission module. By such an arrangement, the worm (41) rotates with the actuating axle (411). The worm gear (42) is rotated by the worm (41), and the rotational movement will be transmitted to another module unit through the drive axle (43) and the second connector (14).

Figure 7:
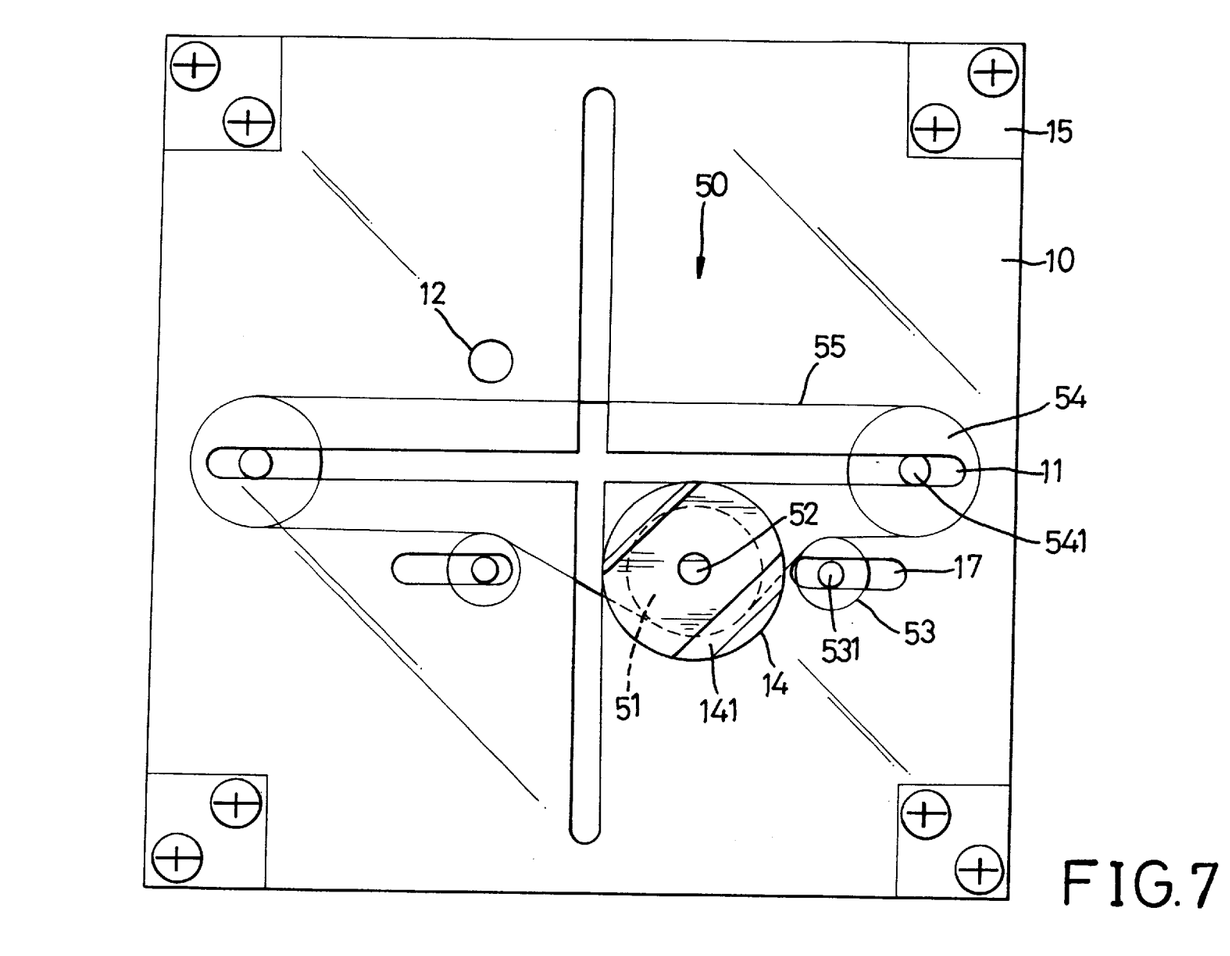
FIG. 7 is a front plan view of a fourth embodiment of the mechanical transmission module in accordance with the present invention.
Figure 8:
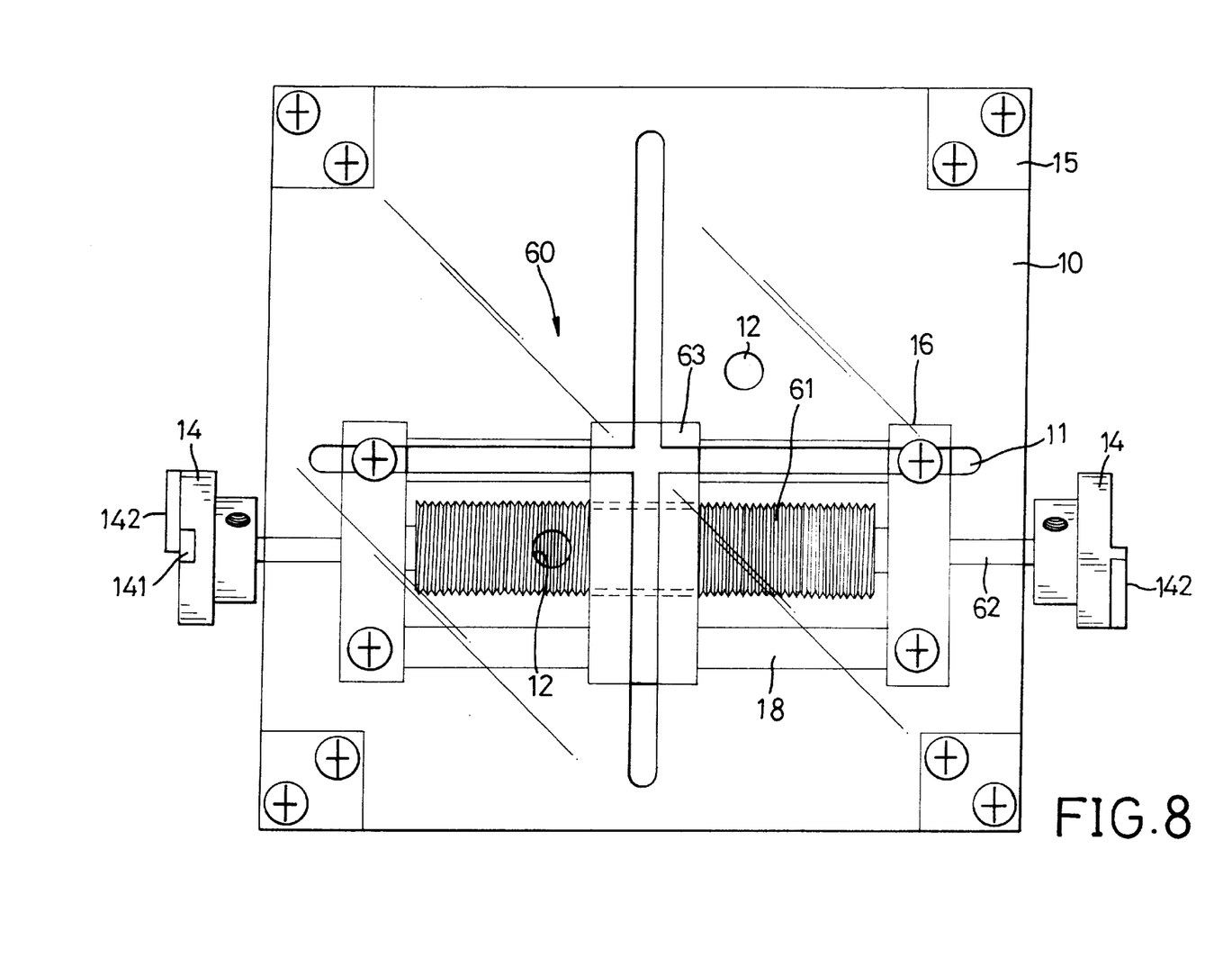
FIG. 8 is a front plan view of a fifth embodiment of the mechanical transmission module in accordance with the present invention.

With reference to FIG. 7, the fourth embodiment of the transmission mechanism is a belt drive assembly (50). The belt drive assembly (50) includes an actuating wheel (51), two rotating wheel (54) and a belt (55). The actuating wheel (51) is secured to the actuating axle (52) that extends into one of the bores (12) in the plate (10). A drive axle (541) is secured to each rotating wheel (54) and extends into the slot (11) in one of the plates (10). The belt (55) goes around the actuating wheel (51) and the rotating wheels (54), such that the rotating wheels (54) and the drive axles (541) will be rotated by the actuating wheel (51) through the belt (55). Consequently, the belt drive assembly (50) can simulate the motion of a conveyer. In addition, a tensioning wheel (53) is rotatably mounted between the plates (10) and abuts the belt (55) at a position between the actuating wheel (51) and each drive wheel (54). An auxiliary axle (531) is secured to each tensioning wheel (53). Each auxiliary axle (531) extends into a second slot (17) formed in one of the plates (10). Consequently, belt (55) is adjustable when the auxiliary axle (531) slides along the secondary slot (17). With reference to FIG. 8, the transmission mechanism is a threaded rod and slide mechanism (60). The threaded rod and slide mechanism (60) includes a threaded rod (61) and a slide (63) slidably mounted on the threaded rod (61). Each end of the actuating axle (62) extends out from the gap defined between the plates (10) at a horizontal level the same as that of one of the bores (12). The actuating axle (62) is rotatably mounted between two blocks (16) mounted between the plates (10). Two posts (18) are mounted between the blocks (16) and parallel with the actuating axle (62). A connector (14) is mounted on each end of the actuating axle (62). The threaded rod (61) is co-axially secured to the actuating axle (62). The threaded rod (61) is screwed into a threaded hole formed in the slide (63). The slider (63) has a hole (not shown) for each post (18) extending through the hole. Accordingly, the threaded rod (61) rotates with the actuating axle (62), and the slide (63) will moves along the threaded rod (61) depending on the direction of rotation.

Figure 9:
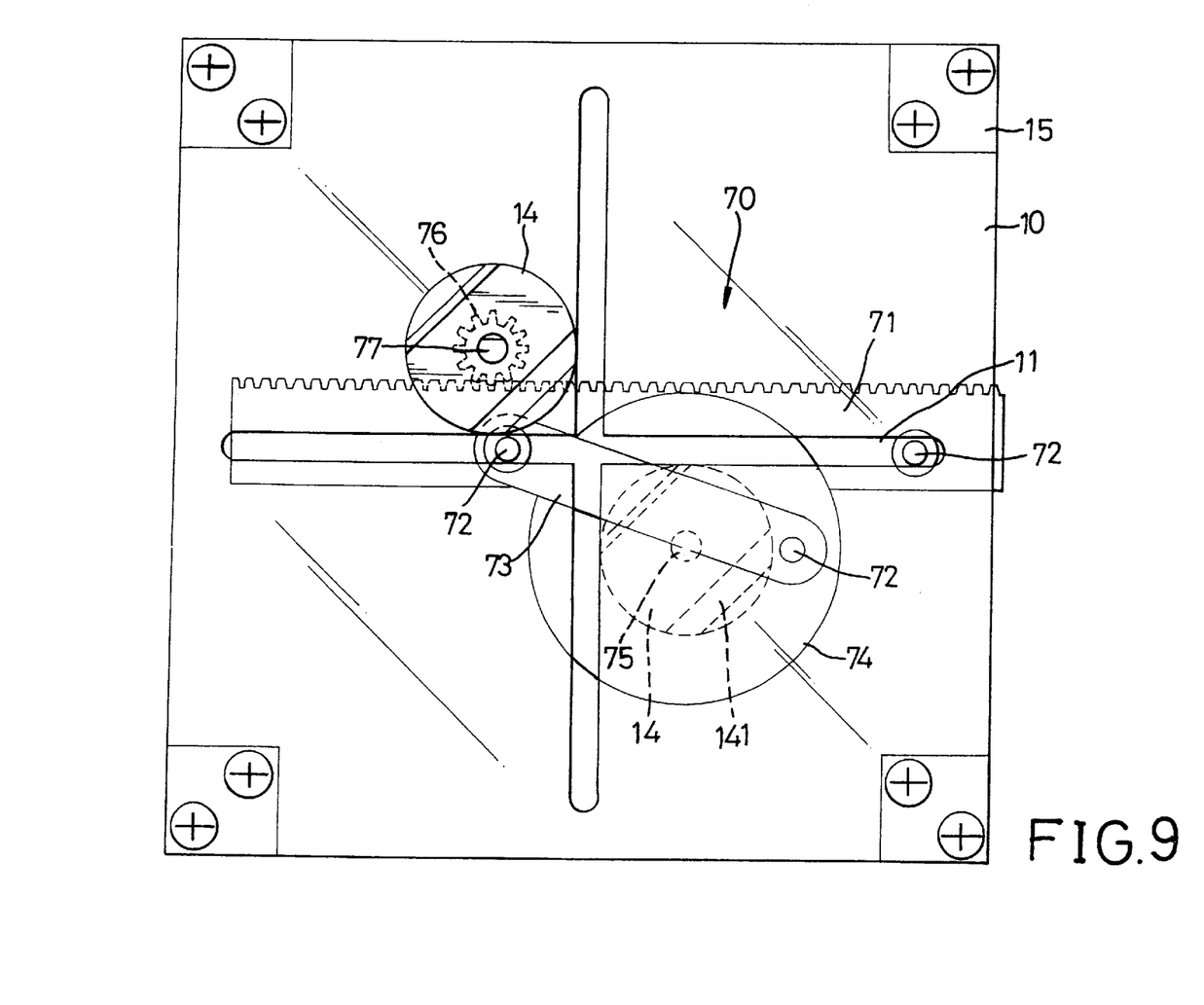
FIG. 9 is a front plan view of a sixth embodiment of the mechanical transmission module in accordance with the present invention.

With reference to FIG. 9, the sixth embodiment of the transmission mechanism is a sliding rack and pinion mechanism (70) to alternately rotate the output. The sliding rack and pinion mechanism includes an actuating wheel (74), an arm (73), a rack (71) and a pinion (76). The actuating axle (75) extends out from one bore (12) of the plate (10). A first connector (14) is secured to one end of the actuating axle (75). The actuating wheel (74) is co-axially secured to the actuating axle (75). One end of the arm (73) is pivotally connected to the actuating wheel (74) at a position far away from the actuating axle (75). The other end of the lever (73) is pivotally connected to the rack (71) with a pin (72). The pin (72) extends into the slot (11). The pinion (76) is engaged with the rack (71). An drive axle (77) is co-axially secured to the pinion (76) and extends out from the other bore (12) of the plate (10). A second connector (14) is secured to the drive axle (77). By such an arrangement the actuating wheel (74) rotates with the actuating axle (75), and the rack (71) will slide back and forth along the slot (11) by the transmission of the arm (73). The pinion (76) and the drive axle (77) will be rotated by the rack (71), such that the rotating power will be transmitted to another module unit through the second connector (14).

Figure 10:
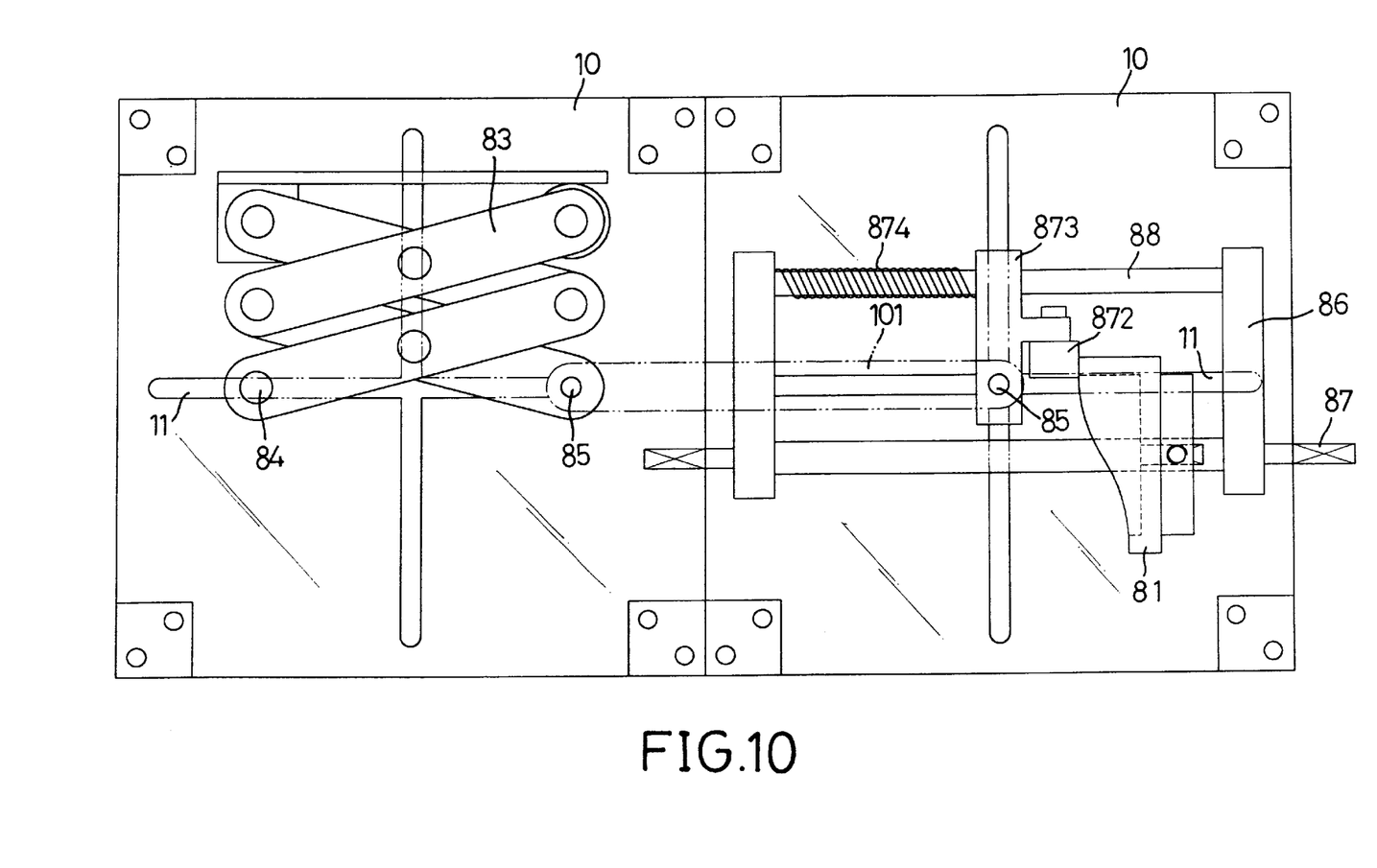
FIG. 10 is a front plan view of a seventh embodiment of the mechanical transmission module in accordance with the present invention.

With reference to FIG. 10, the seventh embodiment of the transmission mechanism includes a cam (81), a post (88), a slide (873), a lever (101) and a lifter (83). One end of the actuating axle (87) extends out from the gap defined between the plates (10) at a horizontal level the same as that of one of the bores (12). The actuating axle (87) is rotatably mounted between two blocks (86) mounted between the plates (10). A connector (not shown) is mounted on the end of the actuating axle (87). The cam (81) is co-axially secured on the actuating axle (87). The post (88) is secured between the blocks (86). The slide (873) is slidably mounted on the post (88). A wheel (872) is rotatably mounted on the slide (873) and abuts the cam (81). A spring (874) is mounted around the post (88) and abuts the slide (873). A pin (85) is inserted into the slide (873) and extends into the slot (11) in one of the plate (10). The lever (101) is connected between the slide (873) and the lifter (83) with two pins (85). Another pin (84) is inserted through the other end of the lifter (83). The pins (84, 85) extend into the corresponding slot (11).

With such a transmission mechanism, the cam (81) rotates with the actuating axle (87), and the slide (873) is pushed along the post (88) by the cam (81). The lifter (83) is actuated by the slide (873) through the transmission of the lever (101), and the pins (84, 85) sliding along the slot (11). The spring (874) provides a return force to the slide (873) to move the slide (873) back along the post (88).

With reference to FIG. 11 and FIGS. 1, 5 and 6, a first embodiment of the operation between several modules entails the meshing of the connectors between the modules. A connector (14) is secured to the rotating shaft (83) of a motor (81) with a gearbox (82). The actuating axle (21) of the first module (101) with the Geneva mechanism (20) is connected with the rotating shaft (83) by the engagement of the connectors (14). The connector (14) secured to the actuating axle (411) in a second module (102) with a worm and gear mechanism (40) is selectively connected to the connector (14) secured to the actuating axle (21) or the drive axle (23) of the first module (101). The connector (14) secured to the actuating axle (311) in a third module (103) with slide-crank mechanism (30) is connected to the connector (14) secured to the drive axle (43) of the second module (102).

Figure 11:
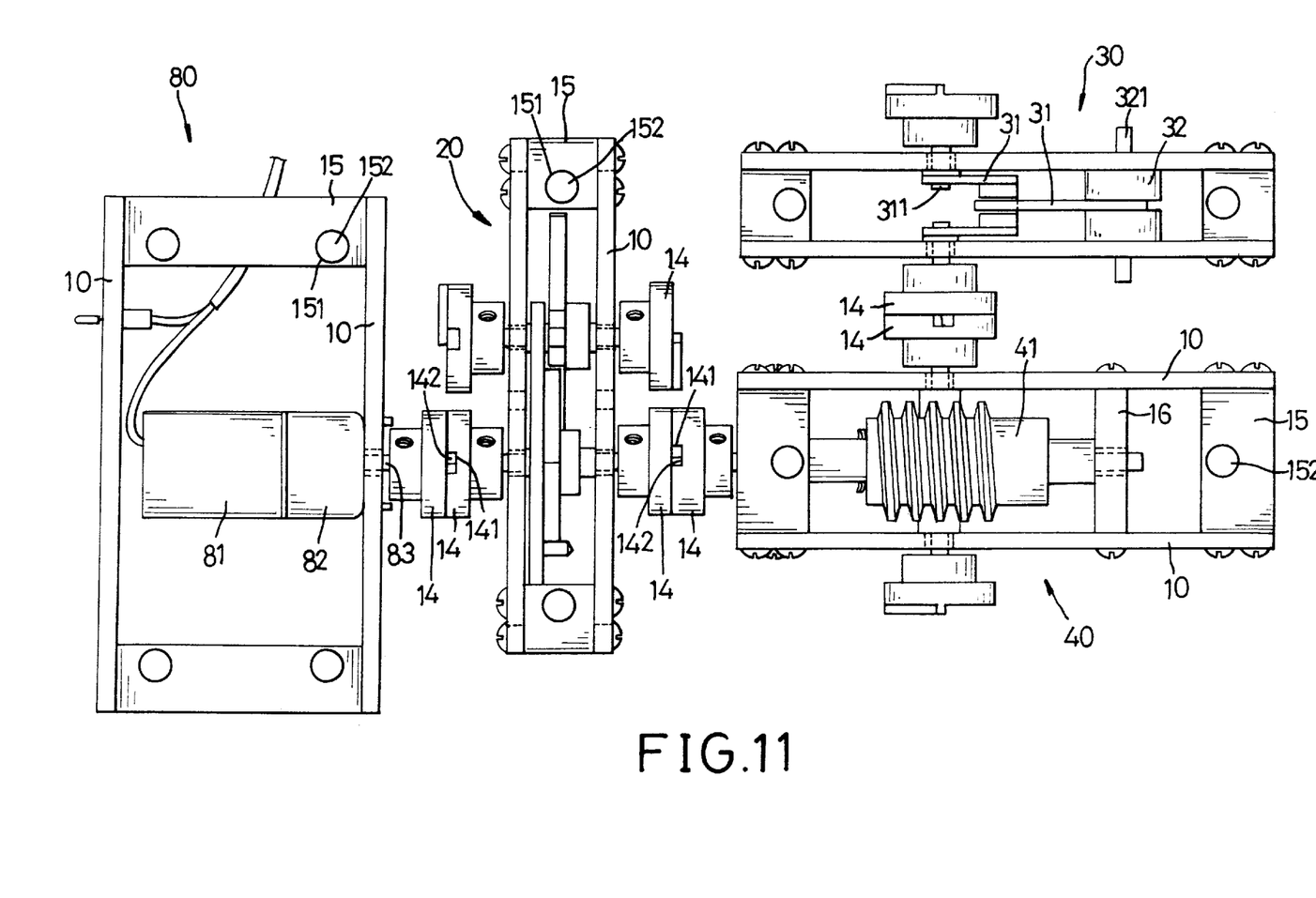
FIG. 11 is a top plan view of an embodiment of the combinations of several mechanical transmission modules in accordance with the present invention.

Consequently, the slide (32) in the third module (103) will slide along the slot (11) by the transmissions of the Geneva mechanism (20) in the first module (101), the worm and gear mechanism (40) in the second module (102) and the slide-crank mechanism (30) in the third module (103). It is much easier for virtually anyone to understand the transmissions and the operative relationships between the three types of the mechanisms when the combination of the modules is observed in operation.

Figure 12:
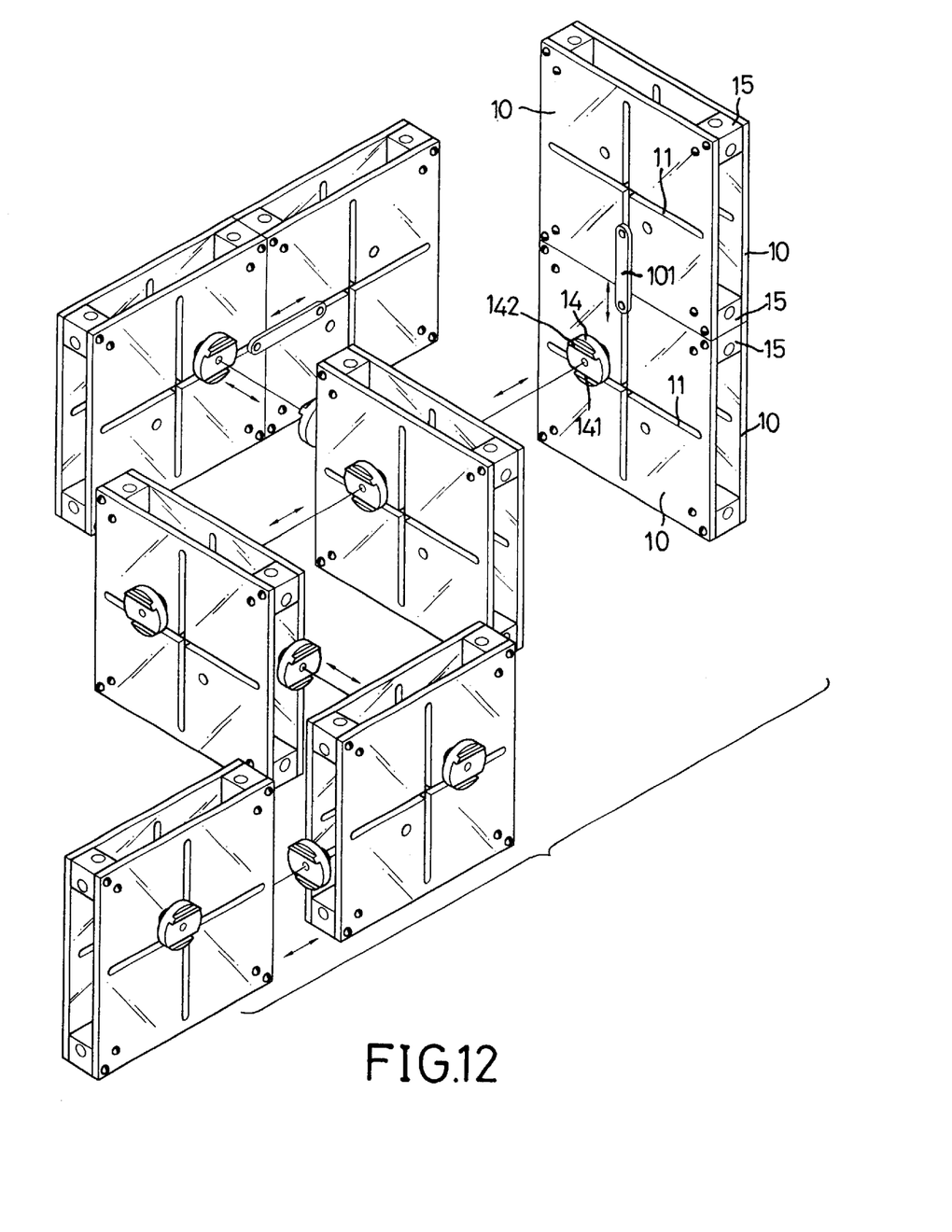
FIG. 12 is a perspective view of another embodiment of the combinations of several mechanical transmission module in accordance with the present invention.

With reference to FIGS. 2 and 12, because magnets (152) are mounted in each block (15) between the plates (10), two modules can be attached to each other in three-dimension by means of the magnets (152). Consequently, several modules with different types of transmission mechanisms can be freely combined based on the need of the user. The user can understand the transmissions and operative relationships between different types of transmission mechanisms through the combination of the modules.

Figure 13:
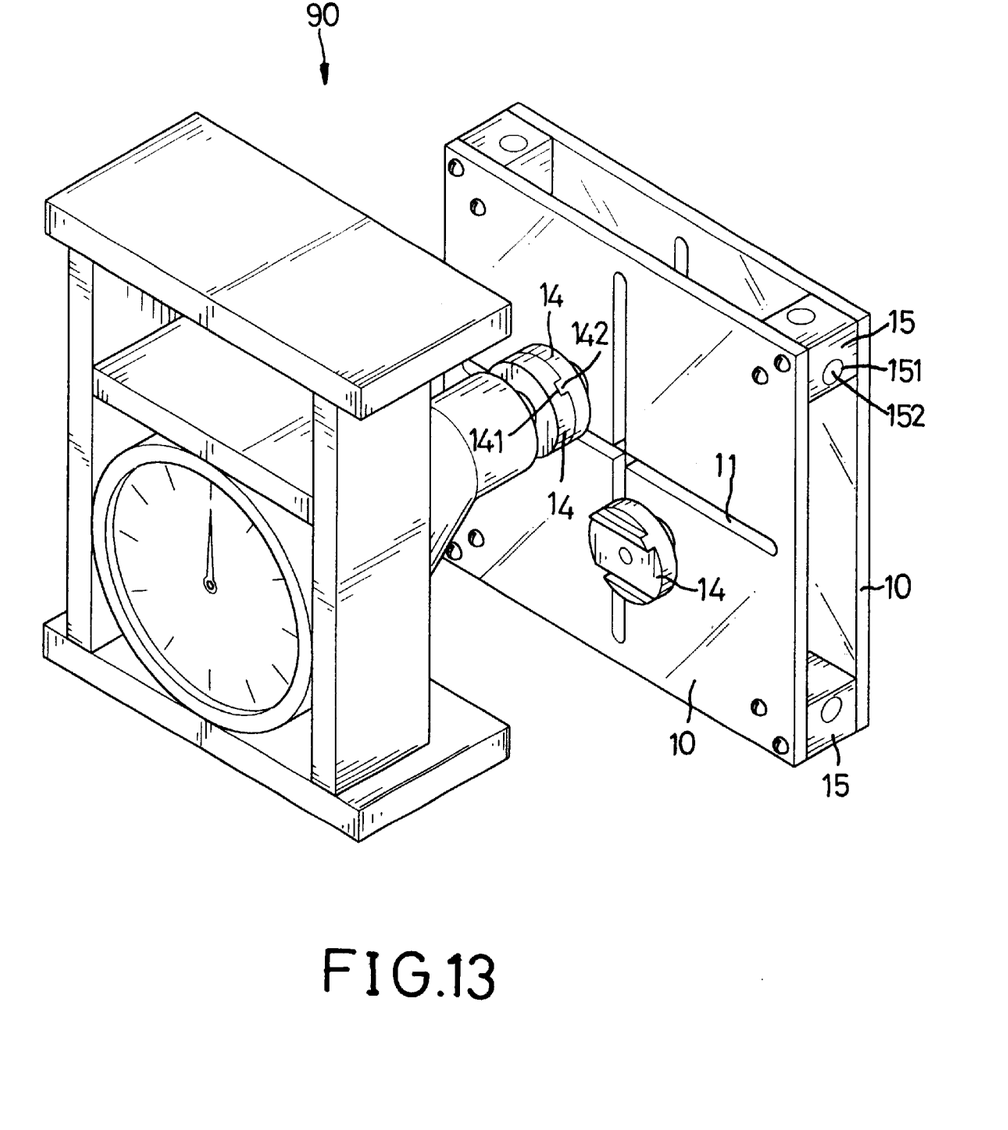
FIG. 13 is a perspective view of the mechanical transmission module in accordance with the present invention combined with a meter.

In addition, with reference to FIG. 13, a meter (90) with a connector (14) is connected to the connector (14) of a module. The meter (90) can be used to measure the rotating velocity, the torsion or the angular position of the actuating axle or the drive axle in the module unit. This will help the user to further understand the exact condition of the transmission mechanism in each module.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mechanical transmission module comprising:

two plates, each of said plates having a contour with a plurality of corners;

a plurality of blocks secured between the two plates at respective corners thereof to secure the two plates together and form a gap between the plates;

at least one magnet mounted in an external face of each of the plurality of blocks;

two perpendicular, bisecting slots defined in each plate, each of the slots in one plate being aligned with a corresponding slot defined in the other plate;

a transmission mechanism mounted between the plates;

an actuating axle extending out from the two plates and connecting to the transmission mechanism; and a connector secured to one end of the actuating axle and having a groove and a protrusion formed on an external face of the connector to engage with a corresponding groove and a corresponding protrusion on a respective connector of another mechanical transmission module.

2. The mechanical transmission module as claimed in claim 1, wherein the transmission mechanism is a Geneva mechanism including a Geneva wheel and a Geneva gear meshed with the Geneva wheel, wherein to the Geneva wheel is co-axially secured the actuating axle that extends through one of the plates;

the Geneva gear is co-axially secured to a drive axle that extends through one of the plates; and a second connector is secured to an end of the drive axle and has a groove and a protrusion formed on the external face of the connector to engage with the groove and protrusion on the connector of another mechanical transmission module.

3. The mechanical transmission module as claimed in claim 1, wherein the transmission mechanism is a slide-crank mechanism.

4. The mechanical transmission module as claimed in claim 3, wherein the slide-crank mechanism includes a first arm, a second arm and a slide,
   wherein the first arm is connected to the actuating axle;
   the second arm is connected between the free end of the first arm and the slide; and
   a pin is attached to the slide and extends into the slot of one of the plates.

5. The mechanical transmission module as claimed in claim 4, wherein the actuating axle extends out from one of the plates.

6. The mechanical transmission module as claimed in claim 1, wherein the transmission mechanism is a worm and gear mechanism.

7. The mechanical transmission module as claimed in claim 6, wherein the worm and gear mechanism includes a worm and a worm gear engaged with the worm,
   wherein the worm is secured to the actuating axle;
   a drive axle is secured to the worm gear; and
   a second connector is secured to one end of the drive axle and has a groove and a protrusion formed on the external face of the connector to engage with the groove and protrusion on the connector of another mechanical transmission module.

8. The mechanical transmission module as claimed in claim 10, wherein the actuating axle extends out from the gap defined between the plates; and
   the drive axle extends out from one of the plates.

9. The mechanical transmission module as claimed in claim 8, wherein two blocks are mounted between the plates and the actuating axle is rotatably mounted between the blocks.

10. The mechanical transmission module as claimed in claim 1, wherein the transmission mechanism is a belt drive assembly.

11. The mechanical transmission module as claimed in claim 10, wherein the belt drive assembly includes an actuating wheel, two rotating wheels and a belt mounted around the actuating wheel and the rotating wheels,
    wherein the actuating wheel is secured to the actuating axle; and
    each of the rotating wheel is secured to a drive axle that extends into the slot in one of the plates.

12. The mechanical transmission module as claimed in claim 11, wherein a tensioning wheel is rotatably mounted between the plates and abutting the belt at a position between the actuating wheel and each of the two rotating wheels.

13. The mechanical transmission module as claimed in claim 12, wherein each tensioning wheel is secured to an auxiliary axle; and
    a second slot is defined in one of the plates into which each auxiliary axle extends.

14. The mechanical transmission module as claimed in claim 1, wherein the transmission mechanism is a threaded rod and slide mechanism.

15. The mechanical transmission module as claimed in claim 14, wherein the threaded rod and slide mechanism includes a threaded rod and a slide moveably mounted on the threaded rod,
    wherein the threaded rod is co-axially secured to the actuating axle; and
    each end of the actuating axle extends out from the gap defined between the plates and has a connector mounted on each end of the actuating axle,
    wherein each connector has a groove and a protrusion formed on the external face of the connector to engage with the groove and protrusion on the connector of another mechanical transmission module.

16. The mechanical transmission module as claimed in claim 1, wherein the transmission mechanism is a sliding rack and pinion mechanism.

17. A mechanical transmission module comprising:
    two plates attached to each other with a gap between the plates;
    two perpendicular, bisecting slots defined in each plate, each of the slots in one plate being aligned with a corresponding slot defined in the other plate;
    a transmission mechanism mounted between the plates, the transmission mechanism is a sliding rack and pinion mechanism;
    an actuating axle extending out from the two plates and connecting to the transmission mechanism; and
    a connector secured to one end of the actuating axle and having a groove and a protrusion formed on an external face of the connector to engage with a corresponding groove and a corresponding protrusion on a respective connector of another mechanical transmission module;
    the sliding rack and pinion mechanism includes an actuating wheel, an arm, a rack and a pinion, wherein the actuating wheel is co-axially secured to the actuating axle;
      one end of the arm is pivotally connected to the actuating wheel at a position away from the actuating axle;
      an other end of the arm is pivotally connected to the rack with a pin;
      the pin extends into the slot in the plate;
      the pinion is engaged with the rack; and
      the pinion is co-axially secured to a drive axle that extends out from one of the plates.

18. The mechanical transmission module as claimed in claim 1, wherein the transmission mechanism includes a cam, a post, a slide, a lever and a lifter,
    wherein the cam is mounted between the plates and co-axially secured on the actuating axle;
    two blocks separately mounted between the plates to hold the post;
    the slide is slidably mounted on the post;
    a wheel is rotatably mounted on the slide and abuts the cam;
    a spring is mounted around the post and abuts the slide to provide a return force to the slide;
    a pin mounted on the slide and extends into the slot in one of the plates; the lever is connected between the slide and the lifter,
    thereby the slide is actuated to slide along the post as the cam rotates with the actuating axle; and
    the lifter is actuated by the slide through the transmission of the lever.

* * * * *